Dec. 1, 1936.  A. B. NORTON  2,062,625
PISTON
Filed July 18, 1927
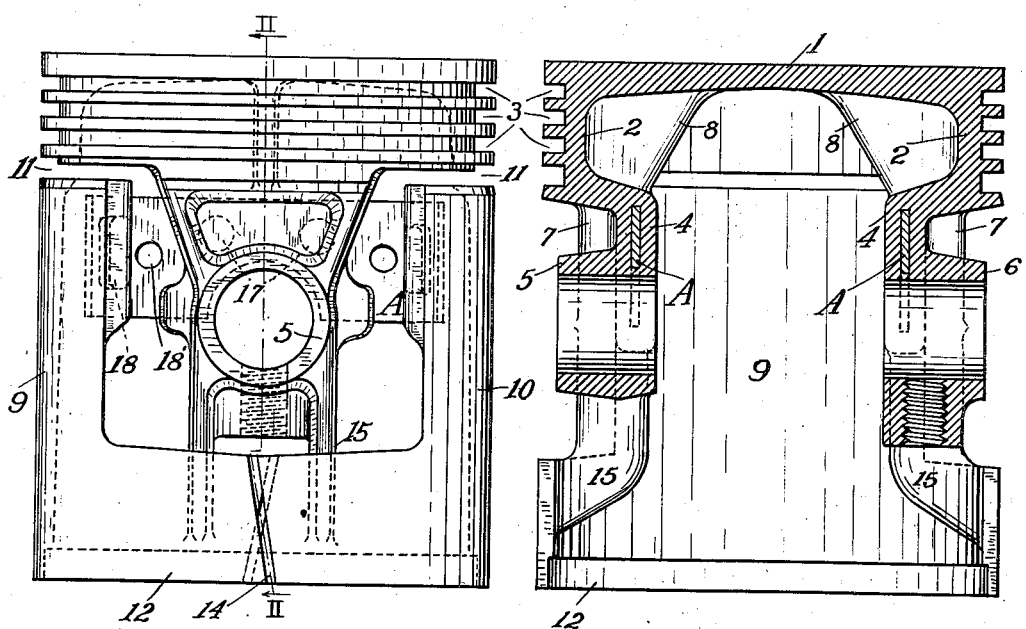
Fig. 1
Fig. 2
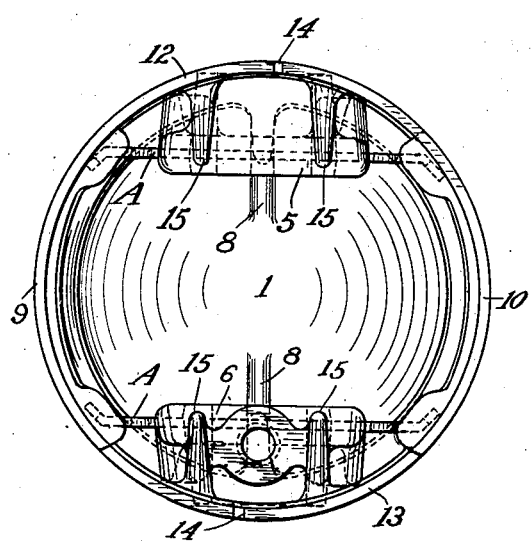
Fig. 3
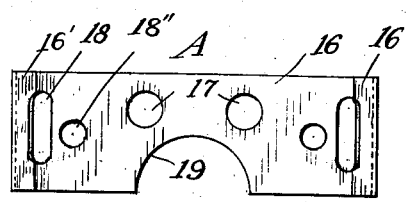
Fig. 4
INVENTOR
Allen B. Norton
BY
Richey & Watts
ATTORNEYS Patented Dec. 1, 1936

2,062,625

UNITED STATES PATENT OFFICE 2,062,625

PISTON

Allen B. Norton, Cleveland, Ohio, assignor, by mesne assignments, to The Cleveland Trust Company, trustee, Cleveland, Ohio, a corporation of Ohio Application July 18, 1927, Serial No. 206,450

5 Claims. (Cl. 309—13)

This invention relates to pistons for internal combustion engines and the like, and more particularly to pistons made of a material having a relatively high coefficient of expansion, such as aluminum, aluminum alloys and the like, and intended to be used in cylinders made of material having a relatively low coefficient of expansion, for instance, cast iron or the like.

It is well known that such pistons present many desirable qualities, such as lightness, high heat conductivity, and the like, but since the coefficent of expansion due to heat of such material differs from that of the cylinders in which they operate, difficulties and disadvantages are encountered at various temperatures. For example, pistons that will not slap when cold, will stick when hot, and vice versa.

I have provided a piston which may be made of material having a high coefficient of expansion relative to the cylinder in which the piston operates, which can be fitted with very small clearance when installed, and which will substantially maintain this clearance throughout the temperature ranges met in practice, without slapping, binding, or scoring of the cylinder, or undue wear of the piston itself.

The invention will be better understood from a description of one practical embodiment thereof, illustrated in the accompanying drawing in which, Fig. 1 is a side elevation of a piston embodying my invention.

Fig. 2 is a longitudinal section thereof taken on the line 2—2 of Fig. 1.

Fig. 3 is a bottom plan view of the piston shown in Figs. 1 and 2, and

Fig. 4 is a side elevation of the member A, shown in the preceding figures.

The piston comprises a head having a flat top 1, and a depending annular flange 2, provided with grooves 3 for the usual piston rings. Depending from the flange 2 are walls or webs 4, which carry wrist pin bosses 5 and 6. The walls 4 are strengthened and stiffened by webs 7 and 8, which join them to the piston head.

The skirt of the piston consists of thrust or bearing faces 9 and 10, spaced from the head by air gaps 11. Strap-like portions 12 and 13 nearly connect the bearing faces below the wrist pin bosses, but are separated by splits 14 to permit expansion of the skirt without material deformation. The strap-like portions are connected, adjacent the splits, to webs 15 depending from the wrist pin bosses, which webs support the strap-like portions radially, but are sufficiently flexible transversely to allow expansion of the skirt to partly close the splits.

The bearing faces are connected together and to the wrist pin bosses by horizontal straps or links A, of a material having a coefficient of expansion less than that of the remainder of the piston, and which may be substantially the same as that of the cylinder in which the piston is to be used, iron or steel being suitable for pistons for use in cast iron cylinders. As best shown in Fig. 4, each link consists of a flat straight side portion 16 and end portions 16' angularly disposed thereto. The flat portion of each link is perforated at 17 and 18 to provide a firm anchorage for the metal of the piston. A semi-circular notch 19 is cut in the center of the lower edge of the link to allow the same to extend down within the sides of the wrist pin bosses.

As shown, the ends of the links are completely embedded in the bearing faces and central portions thereof are embedded in the wrist pin bosses and webs 4. Metal passes through the perforations 17 and 18, and the angularly disposed ends are entirely embedded in the bearing faces, so that the links are firmly anchored to the bearing faces at their ends and to the webs and wrist pin bosses at their centers.

The metal of the bearing faces completely fills the elongated perforations 18, the bosses of the bearing faces terminating at the inner edge of these perforations. This permits the metal, in being cast, to expel all air from these perforations and results in a very substantial and efficient bond between the two metals.

The links are preferably made of steel or some similar material which expands less rapidly than the metal of the piston, and controls the distance between the bearing faces.

While I have described the illustrated embodiment of my invention in some particularity, obviously many modifications, variations, and adaptations thereof will occur to those skilled in this art and I do not, therefore, limit myself to the precise details shown, but claim as my invention all modifications, variations and equivalent structures coming within the scope of the subjoined claims.

I claim:

1. A piston having a skirt with spaced bearing faces and a perforated vertically disposed link at each side of said skirt, having one end embedded in each bearing face, the metal of the bearing faces extending through and filling the end perforations, the metal of the bearing faces terminating at the inner edges of the end perforations of the link.

2. A piston having a head provided with depending walls, wrist pin bearings therein, and a skirt cut away about said wrist pin bearings to form spaced bearing faces, the skirt having a perforated vertically disposed link at each side thereof above the wrist pin bearings, the link having one end embedded in each bearing face, the metal of the bearing faces extending through and filling the end perforations, the metal of the bearing faces terminating at the inner edges of the end perforations of the link.

3. In a piston, a head, boss carrying wall portions depending therefrom, a skirt having cylinder bearing portions disposed between and spaced from said boss carrying wall portions, and a strut member of material less expansible than the material of said cylinder bearing portions embedded therein and in one of said wall portions, said member having a perforation therein, the material of one of said cylinder bearing portions passing through and filling said perforation and extending to, but not beyond, the inner edge of said perforation.

4. A piston comprising a head having depending piers carrying wrist pin bosses, a skirt comprising a substantially cylindrical lower portion having spaced upwardly extending tongues forming opposed thrust faces, said skirt being integrally united with said piers, and said head and skirt being composed of a material having a relatively high co-efficient of expansion, and a pair of chordal struts composed of a material having a relatively low co-efficient of expansion embedded in said piers and having their opposite ends embedded in said opposed thrust faces, each end of each of said struts being formed with a perforation disposed wholly within the strut and spaced from the adjacent end edge of the strut, the material of said thrust faces surrounding and overlapping the ends of said struts and overlapping at least the major portion of each of said perforations and extending through and filling said perforations but not beyond the inner edges thereof.

5. A piston comprising a head having depending piers carrying wrist pin bosses, a skirt comprising circumferentially extending lower portions and spaced upwardly extending tongues forming opposed thrust faces, said head and skirt being integrally connected together and being formed of a material having a relatively high co-efficient of expansion, and a pair of chordal struts embedded in said piers and having their opposite ends embedded in said opposed thrust faces, each end of each of said struts being formed with a perforation, said perforations being formed wholly within the struts and having their outer edges spaced from the adjacent end edges of the struts and their inner edges spaced outwardly from said piers, the material of said thrust faces overlapping the ends of said struts and said perforations, said material extending to but not beyond the inner edges of said perforations and extending through and completely filling said perforations.

ALLEN B. NORTON.